United States Patent
Falk et al.

(10) Patent No.: US 10,122,754 B2
(45) Date of Patent: Nov. 6, 2018

(54) APPARATUS AND METHOD FOR TRANSMITTING DATA

(71) Applicant: SIEMENS AKTIENGESELLSCHAFT, München (DE)

(72) Inventors: Rainer Falk, Poing (DE); Steffen Fries, Baldham (DE)

(73) Assignee: Siemens Aktiengesellschaft, München (DE)

( * ) Notice: Subject to any disclaimer, the term of this patent is extended or adjusted under 35 U.S.C. 154(b) by 155 days.

(21) Appl. No.: 15/106,216

(22) PCT Filed: Oct. 2, 2014

(86) PCT No.: PCT/EP2014/071128
§ 371 (c)(1),
(2) Date: Jun. 17, 2016

(87) PCT Pub. No.: WO2015/090659
PCT Pub. Date: Jun. 25, 2015

(65) Prior Publication Data
US 2016/0315949 A1    Oct. 27, 2016

(30) Foreign Application Priority Data

Dec. 17, 2013    (DE) .......................... 10 2013 226 171

(51) Int. Cl.
*H04L 29/06* (2006.01)
*H04L 29/08* (2006.01)

(52) U.S. Cl.
CPC ............ *H04L 63/145* (2013.01); *H04L 67/12* (2013.01); *H04L 67/2842* (2013.01); *H04L 69/28* (2013.01)

(58) Field of Classification Search
CPC ..... H04L 63/02; H04L 63/0227; H04L 63/12; H04L 63/123; H04L 63/14; H04L 63/1408; H04L 63/145; H04L 2463/121
See application file for complete search history.

(56) References Cited

U.S. PATENT DOCUMENTS 5,812,774 A * 9/1998 Kempf .................. G06F 13/387
                                                        709/212
6,633,835 B1 * 10/2003 Moran ..................... H04L 47/10
                                                        702/181

(Continued)

FOREIGN PATENT DOCUMENTS

CN    101079695 A    11/2007
CN    101599954 A    12/2009
DE    102006036111 B3    1/2008

OTHER PUBLICATIONS

PCT International Search Report for corresponding PCT/EP2014/071128, dated Dec. 16, 2014 with English Translation.

(Continued)

*Primary Examiner* — Eric W Shepperd
(74) *Attorney, Agent, or Firm* — Lempia Summerfield Katz LLC

(57) ABSTRACT

A method and an apparatus for transmitting data from a transmitter in a first communication network (21) to a receiver in a second, safety-critical application network (22) comprises an input buffer unit (31), an output buffer unit (32), a waiting unit (33) and a testing unit (34). The input buffer unit (31) provides the data that are to be transmitted. The waiting unit (33) detects an input time for the data that are to be transmitted, ascertains a dwell time for the data and stores the data that are to be transmitted and/or a check value for the data that are to be transmitted. The testing unit (34) is designed to test the data that are to be transmitted, following expiry of the dwell time, using a test pattern (41)

(Continued)

that is up-to-date following expiry of the dwell time. The output buffer unit (32) is designed to provide the data for the receiver if the data have been deemed uncritical during the check. The test pattern preferably relates to a virus pattern.

16 Claims, 2 Drawing Sheets

(56) References Cited

U.S. PATENT DOCUMENTS

| | | | | |
|---|---|---|---|---|
| 6,757,830 | B1* | 6/2004 | Tarbotton | G06Q 10/107 709/226 |
| 7,080,408 | B1* | 7/2006 | Pak | H04L 63/1408 726/23 |
| 8,291,496 | B2* | 10/2012 | Bennett | H04L 63/1416 726/23 |
| 8,365,283 | B1* | 1/2013 | Satish | G06F 21/564 713/152 |
| 8,533,824 | B2* | 9/2013 | Hutton | G06F 21/562 709/206 |
| 2002/0144121 | A1* | 10/2002 | Ellison | G06F 21/55 713/176 |
| 2002/0199116 | A1* | 12/2002 | Hoene | G06F 21/562 726/24 |
| 2005/0216759 | A1* | 9/2005 | Rothman | G06F 21/56 726/22 |
| 2005/0216770 | A1* | 9/2005 | Rowett | H04L 63/101 726/5 |
| 2005/0262559 | A1* | 11/2005 | Huddleston | G06F 21/53 726/22 |
| 2006/0031937 | A1* | 2/2006 | Steinberg | G06F 21/565 726/24 |
| 2009/0064329 | A1* | 3/2009 | Okumura | H04L 51/12 726/22 |
| 2009/0222907 | A1* | 9/2009 | Guichard | G06F 21/6227 726/17 |
| 2011/0113242 | A1* | 5/2011 | McCormack | G06F 21/6218 713/165 |
| 2014/0215617 | A1* | 7/2014 | Smith | H04L 63/1441 726/23 |

OTHER PUBLICATIONS

Chinese Office Action for Chinese Application No. 201480069204.9, dated May 22, 2018.

* cited by examiner

APPARATUS AND METHOD FOR TRANSMITTING DATA

This application is the National Stage of International Application No. PCT/EP2014/071128, filed Oct. 2, 2014, which claims the benefit of German Patent Application No. 10 2013 226 171.3, filed Dec. 17, 2013. The entire contents of these documents are hereby incorporated herein by reference.

BACKGROUND

The present embodiments relate to an apparatus and a method for transmitting data from a transmitter in a first communication network to a receiver in a second, safety-critical communication network.

In industrial automation systems (e.g., a signal tower or a train controller in railway automation), in production halls in manufacturing automation, for example, or in refineries or breweries in process automation, for example, automation areas that are critical with regard to safety are coupled to general networks (e.g., an office network). Security network gateway units (e.g., firewalls) may be installed at network boundaries between a first communication network and a second, safety-critical communication network in order to couple differently critical network areas in a controlled manner. In such security gateways, the data stream to be transmitted is filtered according to configurable filtering rules and is checked against test patterns (e.g., virus patterns).

The document DE 10 2006 036 111 B3 discloses, for example, a method and a test system for securely transmitting a message from a first zone to a second zone. In this case, the message is transmitted from the first zone to an evaluation unit in a third zone by a one-way lock unit (e.g., a data diode). In this case, copies of the message are made available to different analysis units that check the copies and based on the evaluation result of all analysis units, then possibly forward the message to a second zone. Such an analysis unit is, for example, a virus scanner that checks the messages or the data stream for previously known test patterns (e.g., virus patterns).

In order to achieve reliable protection from malware such as viruses, the test patterns are to be continuously updated. In this case, the test patterns may be updated at hourly intervals or, at the longest, at daily intervals. It is not feasible to load such hourly or daily up-to-date test patterns or virus patterns in industrialization environments. Therefore, "white list" scanners are used instead of virus scanners in practice. A white list specifies the patterns or the data that is allowed to pass through to a second, safety-critical communication network. However, such white list scanners may be used only internally inside a static environment. The white list scanners are not suitable for securely interchanging variable data with external systems since such data has not been entered in the fixed white list.

SUMMARY AND DESCRIPTION

The scope of the present invention is defined solely by the appended claims and is not affected to any degree by the statements within this summary.

The present embodiments may obviate one or more of the drawbacks or limitations in the related art. For example, secure interchange of data at a gateway from a general first communication network to a safety-critical second communication network, while overcoming the disadvantages of the prior art, is provided.

In the method according to one or more of the present embodiments for transmitting data from a transmitter in a first communication network to a receiver in a second, safety-critical communication network, the transmitter provides the data to be transmitted in a first method act. In further method acts, a time of receipt of the data to be transmitted is recorded, and a dwell time is determined based on information relating to the data to be transmitted. The data to be transmitted and/or a check value for the data to be transmitted is/are stored in a dwell memory. In the next method act, after expiry of the dwell time, the data to be transmitted is tested using a test pattern that is up-to-date after expiry of the dwell time, and the data is provided for the receiver if the data is considered to be harmless during the check.

Storing the data to be transmitted and/or the check value for the determined dwell time provides that the data is tested using a test pattern that also identifies malware that may not yet be identified at the time of providing the data. Therefore, when updating test patterns at relatively long intervals, for example, it is possible to provide that no out-of-date test patterns are used for sensitive data.

In one embodiment, before checking the data, the authenticity of the data to be transmitted is provided by re-determining an up-to-date check value for the data to be transmitted and comparing the up-to-date check value with the stored check value.

This has the advantage that less storage capacity is to be kept available for storing the data to be transmitted. The data to be transmitted is provided again only before being checked. It is also possible to provide that stored data to be transmitted is not manipulated during the dwell time in the dwell memory.

In one embodiment, the transmitter pre-registers the data to be transmitted via the transmitter temporarily providing the data to be transmitted only for the purpose of recording the time of receipt and determining the dwell time, and the transmitter providing the data to be transmitted for transmission again after expiry of the dwell time. This likewise reduces the necessary storage capacity in a dwell memory.

In one embodiment, the dwell time is determined based on the time of receipt and/or the predefinable configuration parameters.

This has the advantage that the dwell time may be selected in a manner optimized with respect to the boundary conditions for the data to be transmitted. For example, the dwell time will be selected to be longer in the case of a time of receipt shortly after an update of the test patterns and a relatively long period until the next update than in the case of a test pattern update scheduled shortly after the time of receipt.

In one advantageous embodiment, the dwell time will be statically preconfigured or the dwell time will be randomly determined from a predefinable range of values.

This has the advantage that a simple scheme is used to determine the dwell time, and a simply structured component may perform this task.

In one exemplary embodiment, the dwell time is determined based on the file type of the data to be transmitted.

In this case, for example, a longer dwell time is scheduled for executable file types (e.g., program code) than for a text file that is not critical, for example.

In another exemplary embodiment, the dwell time is determined based on a confidence value of the transmitter and/or based on a security level of the receiver. A confidence value of the transmitter may be specific to the transmitter and/or may be specific to the transmitter domain of the transmitter and/or to the type of transmitter. A transmitter domain of a transmitter is determined, for example, by a subnetwork to which the transmitter is assigned. The transmitter domain may be determined, for example, based on the Internet Protocol (IP) address or the Domain Name System (DNS) name of the transmitter. The type of a transmitter may be determined, for example, by the manufacturer, the model, or the version of the transmitter. The security level of the receiver may likewise be specific to the receiver or specific to the receiver domain of the receiver or specific to the type of receiver.

For example, a low confidence value may be assigned to data that is to be transmitted and is provided by a third-party server on the Internet, whereas a higher confidence value is assigned to data that is to be transmitted and is provided by a server belonging to a development department on the in-house intranet. A shorter dwell time may be assigned, for example, to data that is to be transmitted and has a high confidence value of the transmitter. In the same manner, it is possible to distinguish whether the receiver has a system-critical function or does not directly intervene in critical processes.

In one embodiment, the data to be transmitted is tested using a test pattern that is up-to-date at the time of carrying out the test.

This has the advantage that the most up-to-date test pattern is always used (e.g., if the test itself takes place only a considerable time after expiry of the dwell time).

In one embodiment, the data checked as being harmless is entered in a list of data released for transmission to the second communication network.

This makes it possible to transmit the data in a flexible manner in terms of time (e.g., updates of an entire automation installation or parts of an automation installation that are scheduled for a fixed time).

The apparatus according to one or more of the present embodiments for transmitting data from a transmitter in a first communication network to a receiver in a second, safety-critical communication network includes an input buffer unit, an output buffer unit, a waiting unit, and a testing unit. The input buffer unit, the output buffer unit, the waiting unit, and the testing unit may be formed by one or more processors. The input buffer unit is configured to provide the data to be transmitted. The waiting unit is configured to record a time of receipt of the data to be transmitted and to determine a dwell time based on information relating to the data to be transmitted and to store the data to be transmitted and/or a check value for the data to be transmitted. The testing unit is configured to test the data to be transmitted after expiry of the dwell time using a test pattern that is up-to-date after expiry of the dwell time. The output buffer unit is configured to provide the data for the receiver if the data is considered to be harmless during the check.

In a system in which updated test patterns may be loaded only at relatively long intervals of time, for example, such an apparatus makes it possible to test data against up-to-date test patterns with a high degree of security and therefore to prevent malware from being smuggled into a safety-critical communication network.

A computer program product according to one or more of the present embodiments having program instructions for carrying out the method and a data storage medium that stores the computer program product make it possible to read in or carry out such a method on a wide variety of processor-controlled apparatuses.

BRIEF DESCRIPTION OF THE DRAWINGS

Parts that correspond to one another are provided with the same reference symbols in all figures.

DETAILED DESCRIPTION

Figure 1:
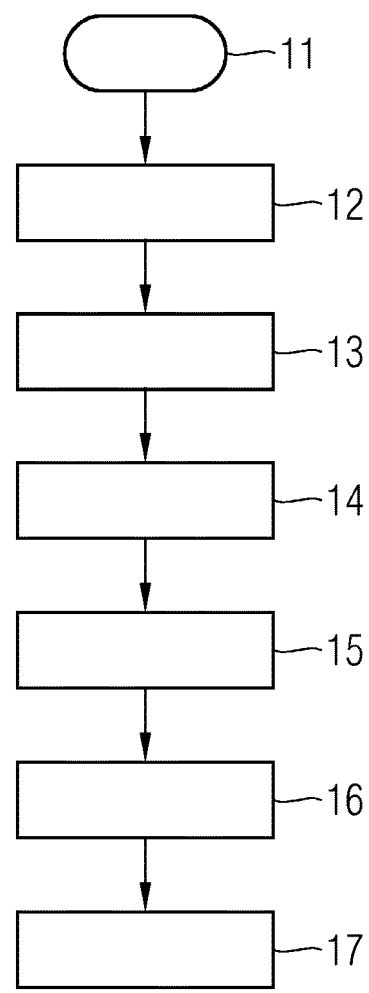
FIG. 1 shows an exemplary embodiment of a method according to an embodiment in the form of a flowchart.

FIG. 1 shows the individual method acts of transmitting data from a transmitter in a first communication network (e.g., an office network) to a receiver in a safety-critical second communication network (e.g., a railway automation network, a vehicle control network or a process automation network).

Starting from an initial state 11, the data to be transmitted is provided by a transmitter in a method act 12. Then, the time of receipt of the data to be transmitted is recorded in method act 13, and a dwell time is determined based on information relating to the data to be transmitted in method act 14. In method act 15, the data to be transmitted and/or a check value for the data to be transmitted is/are then stored in a dwell memory. Method act 15 may alternatively also take place before recording the time of receipt (see method act 13), with the result that the time at which the data to be transmitted and/or the check value is/are stored is detected as the time of receipt.

When storing the data, the file contents themselves are stored. Alternatively or additionally, a check value may be determined from the data to be transmitted and may be stored in the dwell memory. The check value may be, for example, a hash value that is determined using a hash function (e.g., the SHA-256 algorithm). The check value is either created from the provided file containing the data to be transmitted in a corresponding gateway apparatus or else is directly transmitted by the transmitter.

If a check value is stored, before actually checking the data, the authenticity of the data to be transmitted is provided by redetermining an up-to-date check value for the data to be transmitted and comparing the up-to-date check value with the stored check value. The same function as that used to determine the stored check value is used to determine the up-to-date check value. Only if the up-to-date check value and the stored check value match does a check take place using a test pattern that is up-to-date after expiry of the dwell time. If the two check values do not match, an error message may be output, and the method may be aborted, for example.

The dwell time of the data to be transmitted in the dwell memory or the dwell time before the earliest possible testing time is determined, for example, based on the registered time of receipt. The dwell time may be selected, for example, based on the time of the last test pattern update at the time of receipt. However, a random value may also be determined for the dwell time. The random value is greater than a predetermined threshold value or minimum value and/or is in a predefinable range of values, for example.

The dwell time may also be determined based on the file type of the data to be transmitted, for example. This criterion is based on the fact that different data formats have a differently critical effect on the receiver. For example, data relating to a program code that changes parameters of a control device, for example, may be considered to be far more critical than a text file that shows only a new message on a control monitor.

Alternatively or additionally, the dwell time may be dependent on a confidence value of the transmitter for transmitting malware. For this purpose, such a confidence value must have been previously assigned to each transmitter. A confidence value of the transmitter may be specific to the transmitter and/or may be specific to the transmitter domain of the transmitter and/or the type of transmitter.

Alternatively or additionally, the dwell time may be determined based on a security level of the receiver. In addition, a shorter dwell time may be granted to particularly time-critical data that is to be transmitted and is marked accordingly, or this property may be supplied as meta data. The dwell time may likewise be determined based on a "needed by" time assigned to the file. In this case, the dwell time may be optionally extended if the file is required only later. The dwell time may be in the range of hours, for example, or may be days or longer.

After expiry of the dwell time, the data to be transmitted is then checked using the test pattern that is up-to-date after expiry of the dwell time (see method act 16). If data to be transmitted is not directly retrieved by the receiver after expiry of the dwell time, but rather only later, the check using the test pattern that is up-to-date at the time of retrieval may be tested only at the time of retrieval, for example. Even the newest malicious patterns or malware is/are therefore detected. However, the data to be transmitted is checked using a test pattern that is up-to-date at least directly after expiry of the dwell time.

The file is then forwarded to the receiver in the safety-critical communication network if the data is tested to be harmless at the testing time (see method act 17). The test may be carried out by a virus scanner, for example. In this case, the time at which the test is carried out and a reference date of the test patterns used may optionally be added to the tested data as meta data.

As an alternative to forwarding the data, the data or a reference for the data may also be entered in a list of data released for transmission. Such a list is also referred to as a "white list", for example. As a reference for the data, a file name, a download path, or the check value for the data, for example, may be used.

Figure 2:
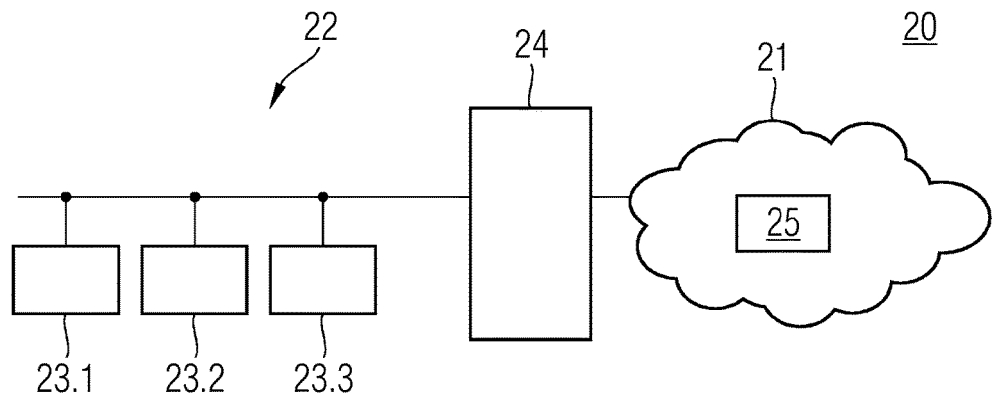
FIG. 2 shows a schematic illustration of a communication environment having an exemplary embodiment of an apparatus.

FIG. 2 shows a communication environment 20 having a first communication network 21 and a second, safety-critical communication network 22. Data that is intended to be transmitted from the first communication network 21 to the second, safety-critical communication network 22 is checked by a security gateway apparatus 24 at the network gateway. Such a security gateway apparatus 24 may be a firewall, for example. The second, safety-critical network may be a railway automation network, a vehicle control network, an energy automation network, a manufacturing automation network, etc. Receivers 23.1, 23.2, 23.3 may be, for example, control devices or a monitoring terminal in such a safety-critical communication network 22. A transmitter 25 in the first communication network 21 may be, for example, a computer apparatus or a server in an office network. The security gateway apparatus 24 may implement the method according to one or more of the present embodiments, for example.

Figure 3:
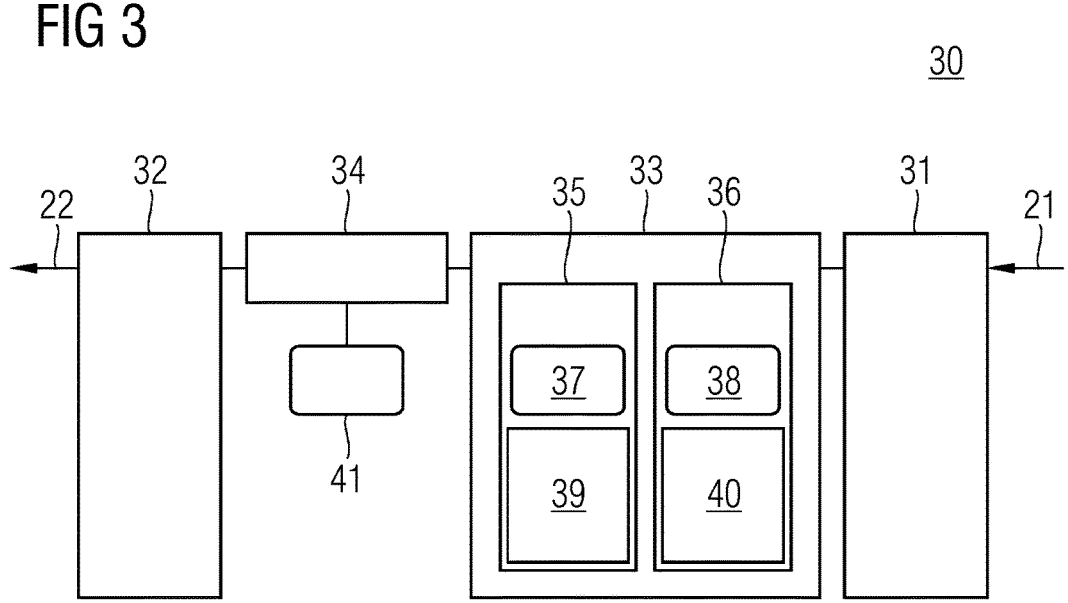
FIG. 3 shows a schematic illustration of an exemplary embodiment of a transmission apparatus.

FIG. 3 shows a gateway apparatus 30 having an embodiment of an apparatus according to one or more of the present embodiments for transmitting data from a transmitter 25 in a first communication network 21 to a receiver 23.1, 23.2, 23.3 in a second, safety-critical communication network 22. The apparatus 30 includes an input buffer 31 that is connected to a waiting unit 33. The waiting unit 33 is connected to a testing unit 34 that has access to continuously updated test patterns 41. The testing unit 34 is connected to an output buffer 32 from which the tested data may be retrieved by a receiver 23.1, 23.2, 23.3 in the safety-critical communication network 22, for example.

The input buffer 31 and the output buffer 32 may be in the form of storage units that temporarily store the data to be transmitted or the tested data either for transfer to the waiting unit 33 or to the second communication network 22.

The waiting unit 33 is configured to store the data 37, 38 provided by the input buffer 31 in a waiting area 35, 36 and to record a time of receipt of the data to be transmitted. In addition, the data to be transmitted is checked for further configuration parameters. A dwell time is determined using this information or configuration data and/or together with the time of receipt. During the determined dwell time, the data 37, 38 to be transmitted remains stored in a waiting area 35, 36. The time of receipt, the dwell time, and, optionally, further information are likewise stored in the waiting unit 33 (e.g., in the corresponding waiting areas 35, 36 of the associated data to be transmitted) as meta data 39, 40.

Instead of storing all the data to be transmitted in a waiting area 35, 36, a check value may also be formed over the data to be transmitted, for example, using a hash function. Only this check value is then stored together with the time of receipt, the dwell time, etc. in an area 35, 36. After expiry of the dwell time, the data 39 to be transmitted that is stored in the first waiting area 35, for example, is forwarded to the testing unit 34 and is checked at the testing unit 34 using an up-to-date test pattern 41. In this case, the test pattern 41 used is to be up-to-date at least at a time directly after the end of the dwell time. If the check is carried out only in a period after the end of the dwell time, the test pattern 41 may also be a test pattern that is up-to-date at this later time. However, the testing unit 34 may also include a plurality of malware scanners (e.g., from different manufacturers) in order to thus increase the probability of detecting malware.

If the test does not reveal any damage to the data, the checked data is provided for the receiver (e.g., for collection) via the output buffer 32.

If a check value is determined by the waiting unit 33 upon the receipt of the data to be transmitted and is stored, for example, as meta data 40 in a second waiting area 36, together with the data 38 to be transmitted that is stored in the area 36, the authenticity of the data to be transmitted is checked before the data is supplied to the testing unit 34. For this purpose, an up-to-date check value is determined from the data to be transmitted using the same algorithm or the same function and is compared with the check value stored in the area 36. If the two check values match, the data to be checked is forwarded to the testing unit 34. If this is not the case, an error message is output, for example.

However, data to be transmitted may also be preregistered. In this case, during preregistration, the data is temporarily transmitted to the waiting unit 33, and the check value is determined and stored at the waiting unit 33. The time of receipt and the dwell time are determined and are communicated to the transmitter, for example. The data to be transmitted either remains in the input buffer 31 until expiry of the dwell time or is provided again by the transmitter 25 itself. The testing of the authenticity of the data to be transmitted and the check itself are carried out after expiry of the waiting time in the same manner as described above.

Instead of providing the tested data in an output buffer 32 for collection by the receiver, the file or a reference of the file (e.g., the file name, a download path, or the check value) may be entered in a white list and released for download.

In addition to using the method according to one or more of the present embodiments in a gateway apparatus 30, for example, such a method may also be implemented in an external network (e.g., as a cloud service). A user acting as the transmitter 25 in this case may upload data to be transmitted to a waiting cloud service. There, the data is stored for the dwell time, which may also be considered to be the quarantine period, and is then tested based on a test pattern that is then up-to-date. If the file is considered to be harmless, the file is provided for download. Only then may the file stored in the waiting cloud service, for example, be loaded by a system into a safety-critical second communication network.

In another application scenario, the data to be transmitted is processed after the quarantine or dwell time in the cloud (e.g., during big data analysis of operating data). In this case, a waiting area in which the uploaded data is buffered is set up in a cloud service. After expiry of the quarantine or dwell time, the data is checked for malicious content before the data is made available to a big data analysis cloud service.

The data to be transmitted may be in any desired file format (e.g., a text file, a program file, an update file, also referred to as a patch, a configuration file, a video file, an audio file, or an Extensible Markup Language (XML) file).

Although the described method and the described apparatus result in a greater delay when transmitting the data, this makes it possible to also take into account malware that is only detected a few days later by a testing unit, for example. This results in increased reliability and reduces the vulnerability to "zero day exploits," with the result that no data having malicious functions known per se are transmitted to a safety-critical communication network.

All of the features described and/or depicted may be advantageously combined with one another within the scope of the invention. The invention is not restricted to the exemplary embodiments described.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for transmitting data from a transmitter in a first communication network to a receiver in a second, safety-critical communication network, the method comprising:
   providing, by the transmitter, data to be transmitted;
   recording a time of receipt of the data to be transmitted;
   determining a dwell time based on information relating to the data to be transmitted;
   storing the data to be transmitted, a check value for the data to be transmitted, or the data to be transmitted and the check value for the data to be transmitted in a dwell memory;
   checking, after expiry of the dwell time, the data to be transmitted using a test pattern that is up-to-date after expiry of the dwell time; and
   providing the data for the receiver when the data is considered to be harmless during the check,
   wherein the transmitter pre-registers the data to be transmitted by temporarily providing the data to be transmitted only for the purpose of recording the time of receipt and determining the dwell time, and by providing the data to be transmitted for transmission again after expiry of the dwell time.

2. The method of claim 1, wherein, before checking the data, the method further comprises providing authenticity of the data to be transmitted, the providing of the authenticity comprising by redetermining an up-to-date check value for the data to be transmitted and comparing the up-to-date check value with the stored check value.

3. The method of claim 2, wherein determining the dwell time comprises determining the dwell time based on the time of receipt.

4. The method of claim 3, wherein the dwell time is statically preconfigured or the dwell time is randomly determined from a predefinable range of values.

5. The method of claim 4, wherein determining the dwell time comprises determining the dwell time based on a file type of the data to be transmitted.

6. The method of claim 5, wherein determining the dwell time comprises determining the dwell time based on a confidence value of the transmitter, a security level of the receiver, or a combination thereof.

7. The method of claim 6, wherein checking the data to be transmitted comprises checking the data to be transmitted using a test pattern that is up-to-date at the time of carrying out the checking.

8. The method of claim 1, wherein determining the dwell time comprises determining the dwell time based on the time of receipt.

9. The method of claim 1, wherein the dwell time is statically preconfigured or the dwell time is randomly determined from a predefinable range of values.

10. The method of claim 1, wherein determining the dwell time comprises determining the dwell time based on a file type of the data to be transmitted.

11. The method of claim 1, wherein determining the dwell time comprises determining the dwell time based on a confidence value of the transmitter, a security level of the receiver, or a combination thereof.

12. The method of claim 1, wherein checking the data to be transmitted comprises checking the data to be transmitted using a test pattern that is up-to-date at the time of carrying out the checking.

13. The method of claim 1, further comprising entering the data checked as being harmless in a list of data released for transmission to the second communication network.

14. An apparatus for transmitting data from a transmitter in a first communication network to a receiver in a second communication network, the second communication network being a safety-critical communication network, the apparatus comprising:
   an input buffer;
   an output buffer;

a waiting unit; and
a testing unit,
wherein the input buffer is configured to provide the data to be transmitted,
wherein the waiting unit is configured to:
   record a time of receipt of the data to be transmitted;
   determine a dwell time based on information relating to the data to be transmitted; and
   store the data to be transmitted, a check value for the data to be transmitted, or the data to be transmitted and the check value for the data to be transmitted,
wherein the testing unit is configured to check the data to be transmitted after expiry of the dwell time using a test pattern that is up-to-date after expiry of the dwell time,
wherein the output buffer is configured to provide the data for the receiver when the data is considered to be harmless during the check, and
wherein the transmitter pre-registers the data to be transmitted by temporarily providing the data to be transmitted only for the purpose of recording the time of receipt and determining the dwell time, and by providing the data to be transmitted for transmission again after expiry of the dwell time.

15. A computer program product comprising a non-transitory computer-readable storage medium storing instructions executable by a processor to transmit data from a transmitter in a first communication network to a receiver in a second, safety-critical communication network, the instructions comprising:
   providing, by the transmitter, data to be transmitted;
   recording a time of receipt of the data to be transmitted;
   determining a dwell time based on information relating to the data to be transmitted;
   storing the data to be transmitted, a check value for the data to be transmitted, or the data to be transmitted and the check value for the data to be transmitted in a dwell memory;
   checking, after expiry of the dwell time, the data to be transmitted using a test pattern that is up-to-date after expiry of the dwell time; and
   providing the data for the receiver when the data is considered to be harmless during the check,
   wherein the transmitter pre-registers the data to be transmitted by temporarily providing the data to be transmitted only for the purpose of recording the time of receipt and determining the dwell time, and by providing the data to be transmitted for transmission again after expiry of the dwell time.

16. A non-transitory computer-readable storage medium that stores instructions executable by a processor to transmit data from a transmitter in a first communication network to a receiver in a second, safety-critical communication network, the instructions comprising:
   providing, by the transmitter, data to be transmitted;
   recording a time of receipt of the data to be transmitted;
   determining a dwell time based on information relating to the data to be transmitted;
   storing the data to be transmitted, a check value for the data to be transmitted, or the data to be transmitted and the check value for the data to be transmitted in a dwell memory;
   checking, after expiry of the dwell time, the data to be transmitted using a test pattern that is up-to-date after expiry of the dwell time; and
   providing the data for the receiver when the data is considered to be harmless during the check,
   wherein the transmitter pre-registers the data to be transmitted by temporarily providing the data to be transmitted only for the purpose of recording the time of receipt and determining the dwell time, and by providing the data to be transmitted for transmission again after expiry of the dwell time.

* * * * *